United States Patent
Singh et al.

(10) Patent No.: US 7,940,665 B2
(45) Date of Patent: May 10, 2011

(54) TRANSPARENT OPTIMIZATION FOR TRANSMISSION CONTROL PROTOCOL FLOW CONTROL

(75) Inventors: Balraj Singh, Los Altos, CA (US); Amit P. Singh, Sunnyvale, CA (US); Vern Paxson, Berkeley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/503,230

(22) Filed: Jul. 15, 2009

(65) Prior Publication Data

US 2009/0274046 A1 Nov. 5, 2009

Related U.S. Application Data

(63) Continuation of application No. 10/981,900, filed on Nov. 4, 2004, now Pat. No. 7,564,792.

(60) Provisional application No. 60/517,934, filed on Nov. 5, 2003.

(51) Int. Cl.
*H04L 12/26* (2006.01)
(52) U.S. Cl. .......... 370/235; 370/252; 370/470
(58) Field of Classification Search .......... 370/235, 370/236, 229, 230, 230.1, 231, 232, 394, 370/252, 470; 709/227, 228
See application file for complete search history.

(56) References Cited

U.S. PATENT DOCUMENTS

| | | | |
|---|---|---|---|
| 5,163,046 A | 11/1992 | Hahne et al. | |
| 6,252,851 B1 | 6/2001 | Siu et al. | |
| 6,381,638 B1 | 4/2002 | Mahler et al. | |
| 6,389,462 B1 | 5/2002 | Cohen et al. | |
| 6,560,243 B1 | 5/2003 | Mogul | |
| 6,564,267 B1 | 5/2003 | Lindsay | |
| 6,587,438 B1 | 7/2003 | Brendel | |
| 6,742,044 B1 | 5/2004 | Aviani et al. | |
| 6,769,030 B1 * | 7/2004 | Bournas | 709/233 |
| 6,772,334 B1 | 8/2004 | Glawitsch | |
| 6,779,033 B1 | 8/2004 | Watson et al. | |
| 6,826,613 B1 | 11/2004 | Wang et al. | |
| 7,058,058 B2 | 6/2006 | Singh et al. | |
| 7,158,522 B1 | 1/2007 | Singh et al. | |
| 7,529,246 B1 | 5/2009 | Singh et al. | |
| 7,583,594 B2 * | 9/2009 | Zakrzewski | 370/229 |

(Continued)

FOREIGN PATENT DOCUMENTS

WO   WO 00/02395 A2   1/2000

OTHER PUBLICATIONS

Notification of Second Office Action dated Jun 5, 2009 for corresponding Chinese Application No. 200480031653.0, 7 pgs.
Notification of First Office Action dated Feb. 29, 2008 for corresponding Chinese Application No. 200480031653.0, 9 pgs.

(Continued)

*Primary Examiner* — Brian D Nguyen
(74) *Attorney, Agent, or Firm* — Shumaker & Sieffert, P.A.

(57) ABSTRACT

A system and method that optimizes transmission control protocol (TCP) flow control without intruding upon TCP's core algorithms. A control module relatively near a sender's local area network (LAN) automatically identifies a packet flow that has become window-limited. After the packet flow has been identified as window-limited, the control module relatively near the sender's LAN and another control module relatively near a receiver's LAN optimize the packet flow by increasing the window size indicated in the receiver's acknowledgment packet. Both control modules operate synchronously to transparently manage the packet flow between the sender and the receiver.

10 Claims, 7 Drawing Sheets

U.S. PATENT DOCUMENTS

| | | | |
|---|---|---|---|
| 2001/0017844 A1 | 8/2001 | Mangin | |
| 2002/0031088 A1 | 3/2002 | Packer | |
| 2002/0172153 A1* | 11/2002 | Vernon | 370/229 |
| 2002/0181494 A1* | 12/2002 | Rhee | 370/465 |
| 2004/0008681 A1 | 1/2004 | Govindarajan et al. | |
| 2004/0044796 A1* | 3/2004 | Vangal et al. | 709/250 |
| 2004/0193733 A1* | 9/2004 | Vangal et al. | 709/250 |
| 2005/0100056 A1* | 5/2005 | Chuberre et al. | 370/532 |
| 2005/0135250 A1 | 6/2005 | Singh et al. | |
| 2005/0135252 A1 | 6/2005 | Singh et al. | |
| 2005/0232161 A1 | 10/2005 | Maufer et al. | |
| 2006/0154603 A1 | 7/2006 | Sachs et al. | |
| 2007/0133605 A1 | 6/2007 | Herrmann | |
| 2008/0056124 A1 | 3/2008 | Nanda et al. | |

OTHER PUBLICATIONS

Supplemental European Search Report dated Jun. 5, 2009 for corresponding European Application No. 04800739.7, 4 pgs.

Zheng Welbin et al., "Improved Approach to Resisting TCP DoS Attacks," Jul. 31, 2003, 9 pgs.

International Search Report and Written Opinion for International Application No. PCT/US2004/36782, mailed Jun. 28, 2006, 7 pgs.

International Preliminary Report on Patentability for International Application No. PCT/US2004/36782, mailed Jul. 24, 2006, 5 pgs.

Communication pursuant to Article 94(3) EPC for EP Application No. 04800739.7, dated Sep. 15, 2009 (5 pgs.).

Notification of Third Office Action dated Aug. 3, 2010, for corresponding Chinese Application No. 200480031653.0, 6 pp.

* cited by examiner

TRANSPARENT OPTIMIZATION FOR TRANSMISSION CONTROL PROTOCOL FLOW CONTROL

This application is a continuation of U.S. application Ser. No. 10/981,900, filed Nov. 4, 2004, which claims the benefit of U.S. provisional Application No. 60/517,934, filed on Nov. 5, 2003, the entire content of each of which is incorporated herein by reference.

This application is related to U.S. patent application Ser. No. 10/983,131, now U.S. Pat. No. 7,058,058, filed on Nov. 4, 2004, entitled "Transparent Optimization for Transmission Control Protocol Initial Session Establishment", the contents of which are hereby incorporated by reference.

FIELD OF THE INVENTION

The present invention relates to the field of networking and the communication of data over a network and more particularly to transparent optimization for transmission control protocol (TCP) flow control.

BACKGROUND OF THE INVENTION

The transmission control protocol (TCP) is one of the most widely used and reliable data transport protocols across communications networks. One of TCP's primary distinctions and the reasons for its widespread use is a robust algorithm to share bandwidth between current TCP sessions. This sharing algorithm within TCP is generally know as "congestion control" since it attempts to avoid the problems of network congestion by automatically scaling back the data transfer to match the available bandwidth capacity. Multiple concurrent and reliable data transfers across a shared network link may result in high congestion if each of the data transfer sessions tries to fully utilize the link capacity. This high congestion may result in high packet loss, which in turn may cause a large number of packet retransmissions, ultimately resulting in network collapse. TCP's congestion control algorithm avoids this problem by automatically determining how much bandwidth is available and sharing the total available bandwidth equally with other concurrent TCP sessions. TCP's dynamic sharing algorithm is therefore a fundamental building block of data communications across a packet switched internet protocol (IP) network and has resulted in the adoption of TCP/IP as a universal communications standard.

TCP utilizes various internal algorithms to provide its capability of congestion control. These algorithms include flow control, slow start, packet reordering, packet loss detection, retransmission timers, and numerous other mechanisms to dynamically decrease or increase the data transmission rate based on network conditions.

Network latency is a common problem that affects network and application performance. Network latency is attributable to several factors, including physical distance, number of hops, switching and router relays, and network congestion. Because these factors are not constants, networks may have unpredictable latency over a period of time. The variation in network latency depends on the distance spanned by the network link and the transmission medium used by the link. For instance, a local high-speed dedicated line between two buildings within a metro area may experience 5 milliseconds (ms) of one-way latency, while a global long distance asynchronous transfer mode (ATM) link between the United States and Europe may have anywhere from 50 to 250 ms of one-way latency. Similarly, a satellite link typically incurs about 240 to 300 ms of one-way latency, due to the time to transmit a signal up to an orbiting satellite and back.

The impact of latency on network applications may be traced directly to the inefficiencies of TCP under conditions of network latency. Most network applications can be classified into short-transaction based "chatty" applications or bulk data transfer applications. Bulk data transfer applications typically transmit 100s of kilobytes or megabytes of data across the network with the total transfer times being measured in several seconds, minutes, and in many cases hours. Examples of such applications include networked file systems, archiving and storage applications, file transfer protocol (FTP) transfers, sharing and distribution of large engineering or design documents, etc. In these applications, the common performance bottleneck is often the latency across the network, which causes lower application throughput via TCP. In particular, the flow control algorithm within TCP often causes the lower application throughput and higher application response time.

TCP's flow control algorithm is a mechanism to prevent the receiver from receiving more data than it is capable of processing or buffering. For example, if the receiving TCP stack has a buffer to store 16 kilobytes of data, the sender is not allowed to transmit more than 16 kilobytes of data at any time to the receiver. The receiver continuously sends back acknowledgments to the sender throughout the data transfer stating how much additional data the receiver can accept. This additional data that the receiver can accept is known as the "window indication" (or "window advertisement") and is included as a field in the TCP header.

The flow control algorithm operates efficiently and does not introduce any unnecessary delays when the receiver and the sender are separated by a short distance low latency link. But as the distance and latency between the receiver and the sender is increased, the round-trip time (RTT) between sending a data packet and then receiving an acknowledgment from the receiver also increases. Since the flow control algorithm prevents the sender from transmitting data to the receiver when the receiver has not indicated that it is ready for this additional data, long RTTs between the two endpoints may cause the sender to delay sending additional data packets to wait for the next acknowledgment from the receiver. For example, if the receiver can accept 16 kilobytes of data at a time, then the sender may transmit all 16 kilobytes in a few milliseconds and then spend several additional milliseconds waiting for an acknowledgment to start transmitting the next block of 16 kilobytes. This period of time during which the sender is waiting for an acknowledgment depends on both the bandwidth and the link latency. The latency-based TCP idle time may cause a single TCP flow to achieve lower throughput than is actually available on the network link. This unused capacity translates into a higher transmission time since the TCP flow cannot utilize the full existing network bandwidth.

Flow pipelining is used for TCP connections that are limited in the rate at which they are able to transfer data because the maximum TCP window size configured on the receiver is smaller than the bandwidth-delay product of the network across which it is transferring the data. A conventional solution to this problem is for the receiver to advertise or indicate a window size that is bigger than the bandwidth-delay product of the network. However, for practical reasons, this indicated window size may be limited by the available memory on the receiver and the sender. As a result, a reasonable value is chosen by operating system developers and set as the default value of the window size. This value is adequate for most TCP connections across a local area network. But when a TCP connection is made across a high latency network, this value may not be adequate. The computers participating in the data transfer cannot dynamically discover and fix the small window size problem. This is because this problem can only be reliably observed by a device (which knows the bandwidth and current utilization of the long latency segment) processing data just before the longest latency segment of the network on the sender side. However, after this device determines that a particular transfer is window-limited, TCP provides no means for the device to inform the receiver that an increased window size is desired.

A solution that arbitrarily has this device increase the window size produces poor results because it generates a large amount of out of window data. Therefore, when there is a minor network error such as a single packet loss, this solution may cause a large amount of data that is outside of the receive window. The data that is outside of the receive window may be discarded by the receiver as it reaches the receiver. In addition to having the sender retransmitting the discarded data, it also causes the sender to misread the loss as a network congestion event and thus to slow down its transmission.

What is needed is a system and method for optimizing TCP's flow control to improve the performance of TCP sessions without intruding upon TCP's core algorithms.

SUMMARY OF THE INVENTION

The present invention is a system and method for optimizing TCP's flow control without intruding upon TCP's core algorithms. The invention bi-directionally monitors the state of TCP flows on both sides of a network pipe. A control module relatively near a sender's local area network (LAN) automatically identifies a packet flow that has become latency-limited (or "window-limited") based on TCP header information. After the packet flow has been identified as window-limited due to the network latency, the control module relatively near the sender's LAN and another control module relatively near a receiver's LAN optimize this packet flow by increasing the window size indicated in the receiver's acknowledgment packet. Both control modules operate synchronously to transparently manage the packet flow between the sender and the receiver. This transparent optimization process allows the sender to maximize the amount of data in transit, thereby substantially minimizing the idle times during which the sender is waiting for additional acknowledgments from the receiver.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Figure 1:
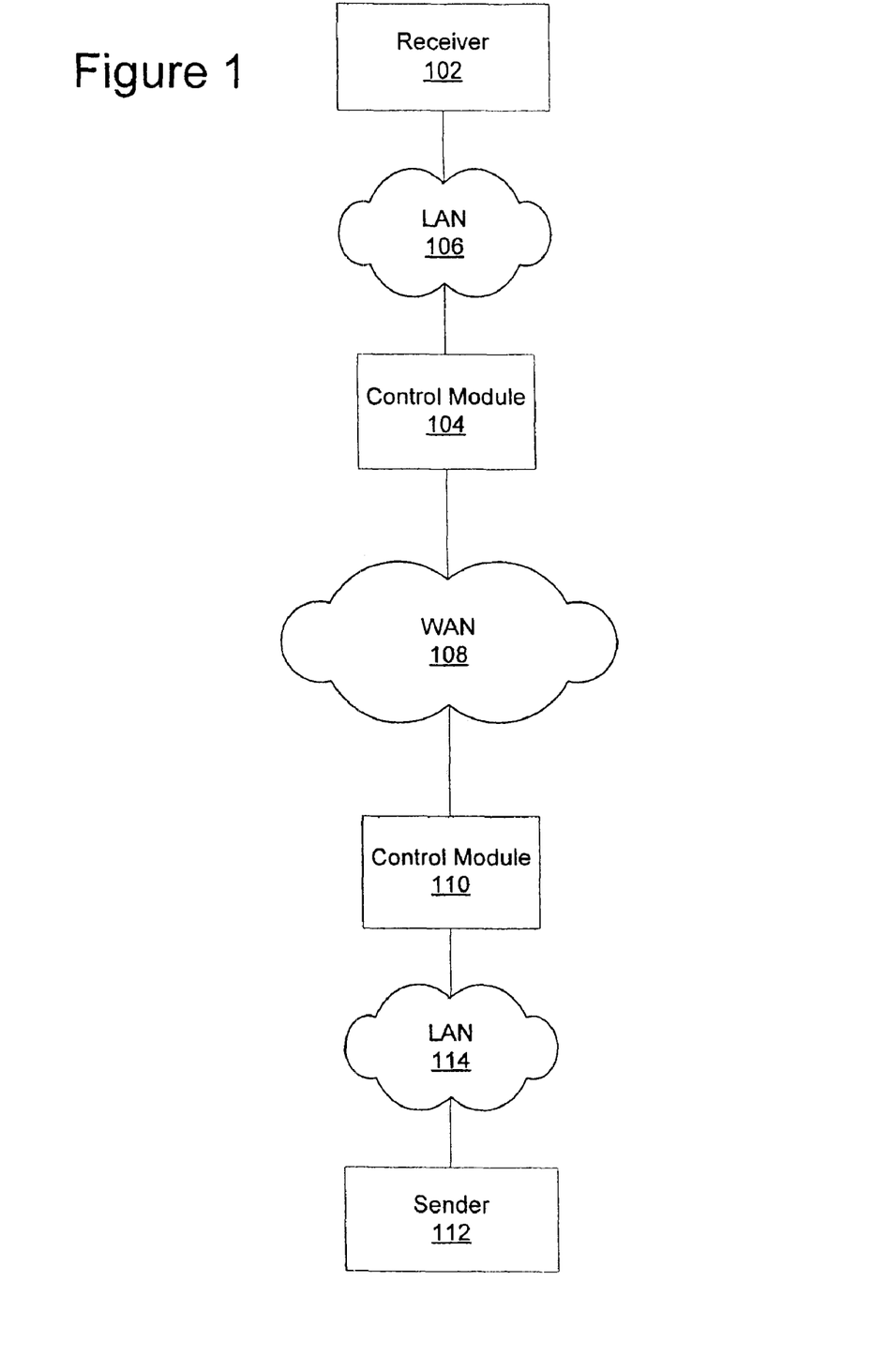
FIG. 1 is an illustration of one example of a network environment in which the present invention can operate.

FIG. 1 is an illustration of one example of a network environment in which the present invention can operate. A receiver 102 can be any device that sends/receives data to/from one or more endpoints using TCP. Receiver 102 is connected to a control module 104 (e.g., in a control device) via a communications network, such as a LAN 106. Alternatively, control module 104 is directly connected to the receiver 102 without via the LAN 106 or is implemented within receiver 102 as a program module. Control module 104 is connected to one or more other control modules via another communications network such as a wide area network (WAN) 108. Even though FIG. 1 shows that control module 104 is connected to one other control module (i.e., the control module 110), control module 104 can be connected to more than one control module. Each of the other control modules is connected to a sender via yet another communications network. For example, FIG. 1 shows that control module 110 (e.g., in a control device) is connected to a sender 112 via a LAN 114. The sender 112 can be any device that receives/sends data from/to one or more endpoints using TCP. Moreover, control module 110 can be directly connected to sender 112 without via the LAN 114 or can be implemented within sender 112 as a program module.

In one embodiment of the invention, control module 104 is located relatively nearer to receiver 102 than to sender 112, while control module 110 is located relatively nearer to sender 112 than to receiver 102. Accordingly, control module 104 is physically and logically associated with receiver 102, and control module 110 is physically and logically associated with sender 112.

After a TCP session has been established between receiver 102 and sender 112, TCP begins to provide flow control service to prevent sender 112 from overflowing the buffer of receiver 102. TCP flow control matches the rate at which sender 112 is sending application-layer data to the rate at which receiver 102 is reading the data. TCP provides flow control by having sender 112 maintain a variable called the receive window. The receive window is used to give sender 112 explicit information on how much free buffer space is available at receiver 102. The receive window is dynamic; that is, it changes throughout a TCP session's lifetime. Receiver 102 informs sender 112 how much spare room it has in the connection buffer by advertising its current value of the receive window in the window field of the TCP packet it sends to sender 112. By keeping the amount of unacknowledged data less than the value of the receive window, sender 112 can prevent itself from overflowing the receiver buffer at receiver 102.

Figure 2A:
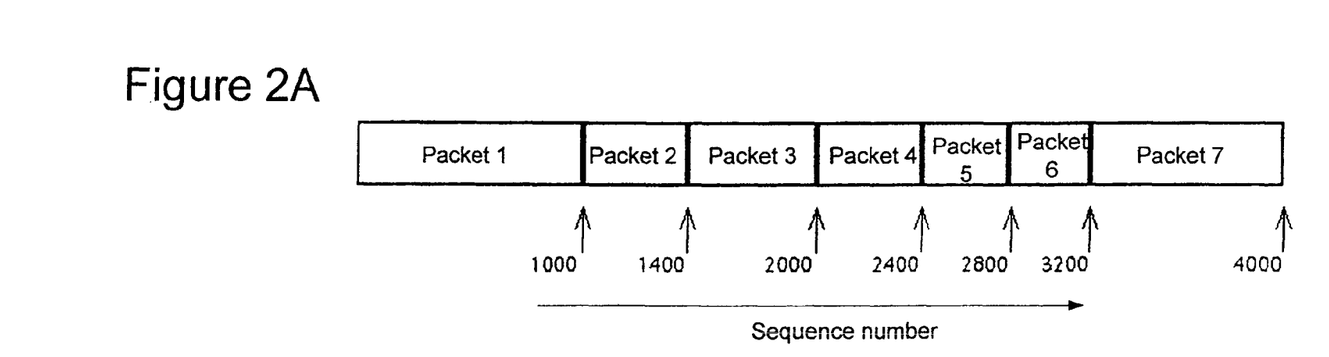
FIGS. 2A and 2B are illustrations of an example of TCP's flow control algorithm.
Figure 2B:
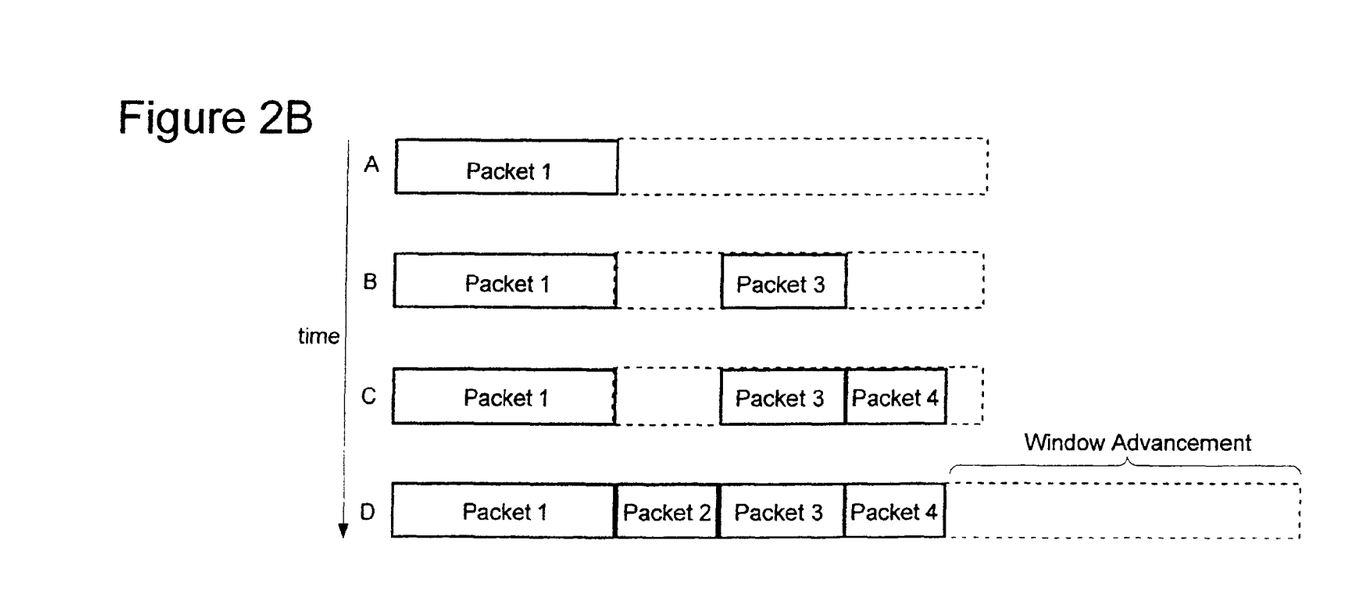

FIGS. 2A and 2B illustrate an example of TCP's flow control algorithm. FIG. 2A illustrates a portion of a byte stream broken into packets and each packet's sequence number. The sequence number for the portion of the byte stream starts at 0. FIG. 2B illustrates how receiver 102 builds up a copy of the byte stream. The dotted box represents the receive window, which is assumed to have a constant value of 1600 for illustration purposes.

At A, packet 1 arrives at receiver 102, which acknowledges it by sending an acknowledgment packet to sender 112 with an acknowledgment number (ACK) of 1000 and a window size (RcvWindow) of 1600. Since ACK+RcvWindow=2600, sender 112 can send packets 2, 3, and 4 to receiver 102. Sender 112 then sends packets 2 and 3 to receiver 102.

At B, packet 3 arrives at receiver 102, but packet 2 has been delayed at the network link. Receiver 102 sends another acknowledgment packet to sender 112 with ACK=1000 and RcvWindow=1600. Sender 112 sends packet 4 to receiver 102 at this time.

At C, packet 4 arrives at receiver 102, but packet 2 is still outstanding. Again, receiver 102 sends an acknowledgment packet to sender 112 with ACK=1000 and RcvWindow=1600. However, sender 112 cannot send packet 5 to receiver 102 at this time because it would bring up the sequence number to 2800, which is greater than ACK+RcvWindow. Sender 112 thus cannot send further packets to receiver 102 until receiver 102 sends a new acknowledgment packet to sender 112.

At D, the delayed packet 2 now reaches receiver 102. Receiver 102 sends an acknowledgment packet to sender 112 with ACK=2400 and RcvWindow=1600. In other words, receiver 102 slides or advances the receive window to allow sender 112 to send more data. This window advancement allows sender 112 to send data up to sequence number 4000 (i.e., ACK+RcvWindow=4000). Accordingly, sender 112 can send packets 5, 6, and 7 to receiver 102.

As can be seen, TCP's flow control algorithm prevents sender 112 from sending data to receiver 102 when receiver 102 has not indicated that it is ready for this additional data. As the distance and latency between receiver 102 and sender 112 is increased, the RTT between sending a packet and receiving an acknowledgment from receiver 102 also increases. Long RTTs between receiver 102 and sender 112 may cause sender 112 to delay sending additional packets to wait for the next acknowledgment from receiver 102.

Thus, in an embodiment of the invention, control module 104 and control module 110 cooperate to synchronously manage the packet flow between receiver 102 and sender 112. According to an embodiment of the invention, control modules 104 and 110 cooperate to increase the indicated window and to keep the pipeline increased to be greater than or equal to the product of network bandwidth and round-trip delay between receiver 102 and sender 112. Thus, embodiments of the invention optimize TCP's flow control by providing a larger indicated window for sender 112 to send data to receiver 102.

Figure 3:
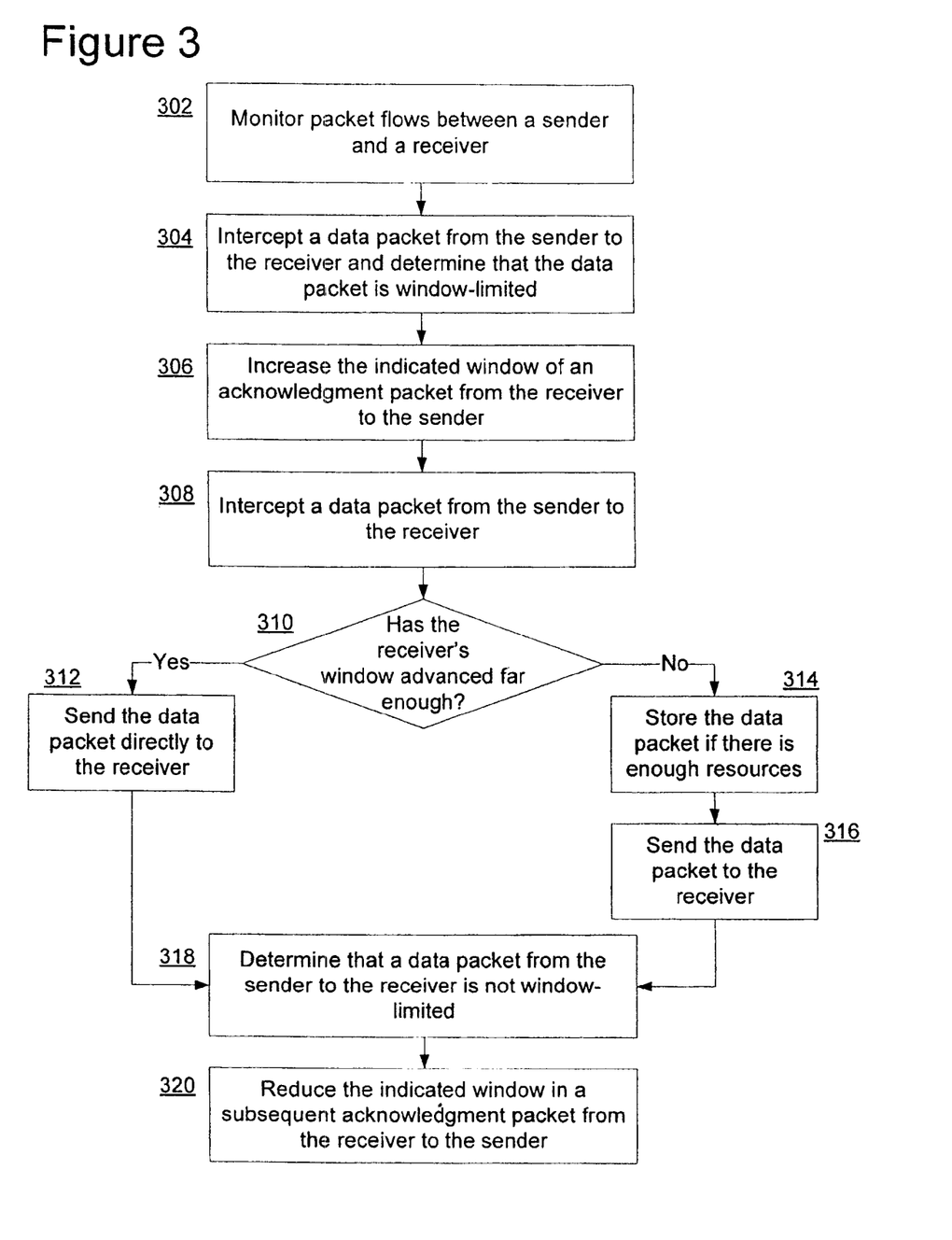
FIG. 3 is a flowchart illustrating a method implemented by one embodiment of the present invention for optimizing TCP's flow control.

FIG. 3 is a flowchart illustrating an operation of TCP's flow control optimized by control modules 104 and 110 according to an embodiment of the invention. Control module 110 associated with sender 112 bi-directionally monitors 302 one or more packet flows between receiver 102 and sender 112. In particular, control module 110 examines the sequence numbers of data packets sent by sender 112 and the acknowledgment numbers and indicated windows of acknowledgment packets sent by receiver 102. Sender 112 sends a data packet to receiver 102. Before the data packet reaches receiver 102, control module 110 intercepts 302 the data packet. Based on the examination of previous packet flows, control module 110 determines that the data packet carries bytes with sequence numbers at or near the top of the window indicated by receiver 102. Control module 110 considers such a data packet to be "window-limited." When control module 110 detects a window-limited packet, it stores the currently indicated window associated with this packet flow in a memory area. Control module 110 can thereafter use the stored window value to determine if a subsequent data packet sent by sender 112 is window-limited.

According to a preferred embodiment of the invention, control module 110 also characterizes the data packet as window-limited (e.g., by using one or more fields available in the TCP header or adding data to the data packet). Control module 110 can also characterize the data packet by using the lowest order bit of the window indication to indicate whether the current data packet is window-limited. After control module 110 characterizes the window-limited data packet, it sends the characterized data packet to receiver 102.

Before the characterized data packet reaches receiver 102, control module 104 associate with receiver 102 intercepts the characterized data packet and learns from seeing the characterization that this packet flow is window-limited. Control module 104 then removes the characterization from the data packet and sends the data packet to receiver 102. For a window-limited packet flow, control module 104 also increases the window indicated by receiver 102 if control module 104 has sufficient buffering resources. In particular, when receiver 102 sends one or more acknowledgment packets to sender 112, control module 104 intercepts these acknowledgment packets and increases 306 the indicated windows indicated in these acknowledgment packets. For example, the changed value of the window indication may be 64 kilobytes. According to an exemplary embodiment of the invention, control module 104 can set the value of the window indication to be as high as 1,073,725,440 bytes by negotiating the window scaling to a sufficiently high value during the connection setup. Control module 104 further sets a flag so that for a subsequent acknowledgment packet from the receiver it also increases the window indication.

Control module 104 sends the adjusted acknowledgment packets to sender 112. Sender 112 receives the adjusted acknowledgment packets and sees the adjusted window indicated in the acknowledgment packets. Because of the larger indicated window, sender 112 sends additional data packets to receiver 102, up to the amount allowed by the adjusted window. Before these data packets reach receiver 102, control module 104 intercepts 308 these data packets as they arrive at control module 104. Control module 104 then determines 310 if receiver 102 has already advanced its window far enough such that a particular data packet arriving from sender 112 is within the current window of receiver 102. In one embodiment of the invention, control module 104 can make this determination by monitoring packet flows from receiver 102 to sender 112. Specifically, control module 104 intercepts one or more acknowledgment packets sent by receiver 102 to sender 112 and determines if receiver 102 has advanced the window far enough to accommodate the data packet from sender 112 (e.g., by examining the acknowledgment number and window size). If receiver 102 has advanced the window far enough to accommodate the data packet, then control module 104 sends 312 the data packet directly to receiver 102 without storing the data packet in its buffer.

On the other hand, if receiver 102 has not advanced the window far enough to accommodate the data packet, control module 104 stores 314 the data packet in its buffer. While the data packet is stored in the buffer, control module 104 continues to monitor acknowledgment packets from receiver 102 to determine if receiver 102 has subsequently advanced the window. If control module 104 determines that receiver 102 has subsequently advanced the window far enough, it sends 316 the stored data packet to receiver 102. In an embodiment of the invention, if TCP timestamp is used in the data packet, control module 104 adjusts the timestamp of the data packet to be as recent as the latest data packet from sender 112 to receiver 102, before sending the data packet to receiver 102.

During the course of the TCP session, the packet flow may no longer be window-limited. For example, after receiver 102 advances its window, it sends one or more acknowledgment packets to sender 112. Based on the acknowledgment number and window size indicated in an acknowledgment packet, control module 110 determines that a data packet from sender 112 to receiver 102 no longer has a sequence number at or near the top of the indicated window and hence is not window-limited. Accordingly, control module 110 characterizes one or more data packets from sender 112 to receiver 102 as not window-limited. Control module 104 intercepts the characterized data packet on its way to receiver 102 and finds out that the packet flow is no longer window-limited. Therefore, for a subsequent acknowledgment packets sent by receiver 102 to sender 112, control module 104 intercepts the acknowledgment packet, adjusts the acknowledgment packet by reducing the indicated window, and forwards the acknowledgment packet to sender 112. In an embodiment of the invention, the amount of each reduction is such that the top of the indicated window remains constant. Control module 104 continues to reduce the indicated window until it reaches the size of the receive window. Moreover, control module 104 can continue to reduce the indicate window until the packet flow becomes window-limited. In this case, control modules 104 and 110 begin to increase the indicated window.

According to an embodiment of the invention, each time control module 104 or 110 changes any field of the TCP header, it also adjusts the checksum of the TCP header such that the checksum is correct if it was correct before the change and incorrect if it was incorrect before the change.

Furthermore, an embodiment of the invention also allows the reporting of control module performances. Specifically, the window indication that is stored in control module 110 along with the current sequence number and acknowledgment number is used to estimate the extent that the increase in window indication is increasing the rate of data transfer (which thus calculates an estimate of the data transfer rate without the optimization by control modules 104 and 110). This estimate can be used to continuously evaluate the efficacy of the optimization. However, with the larger window indication of this optimization, there are more packets passing through the network per second, and it is difficult to accurately estimate the times at which the same packets would pass through the network without the optimization. Accordingly, an embodiment of the invention finds out how much smaller each packet would have to be when not using the optimization so that the packets fit into the original window size, and have the rate at which packets arrive be the same as the rate of packet arrival with the optimization. Thus, the embodiment of the invention estimates how much smaller each packet would be if the packets arrive at the same rate as after the optimization. So for each packet, the following is calculated:

> Size of the packet without optimization=True size of the packet*(original window size/(sequence number of the highest byte in the packet−the current acknowledgment number))

However, the size of the packet without optimization cannot be greater than the current true size of the packet. So if the calculation above produces a value that is greater than the current true size of the packet, then the value of the size of the packet without optimization is set to be the current true size of the packet.

This calculated number is accumulated over time to estimate the data transfer rate without the optimization. Specifically, the total size of packets without the optimization in a period (e.g., 1 second) provides the data transfer rate without the optimization. And the total of the true packet sizes in that period provides the data transfer rate with the optimization.

Figure 4:
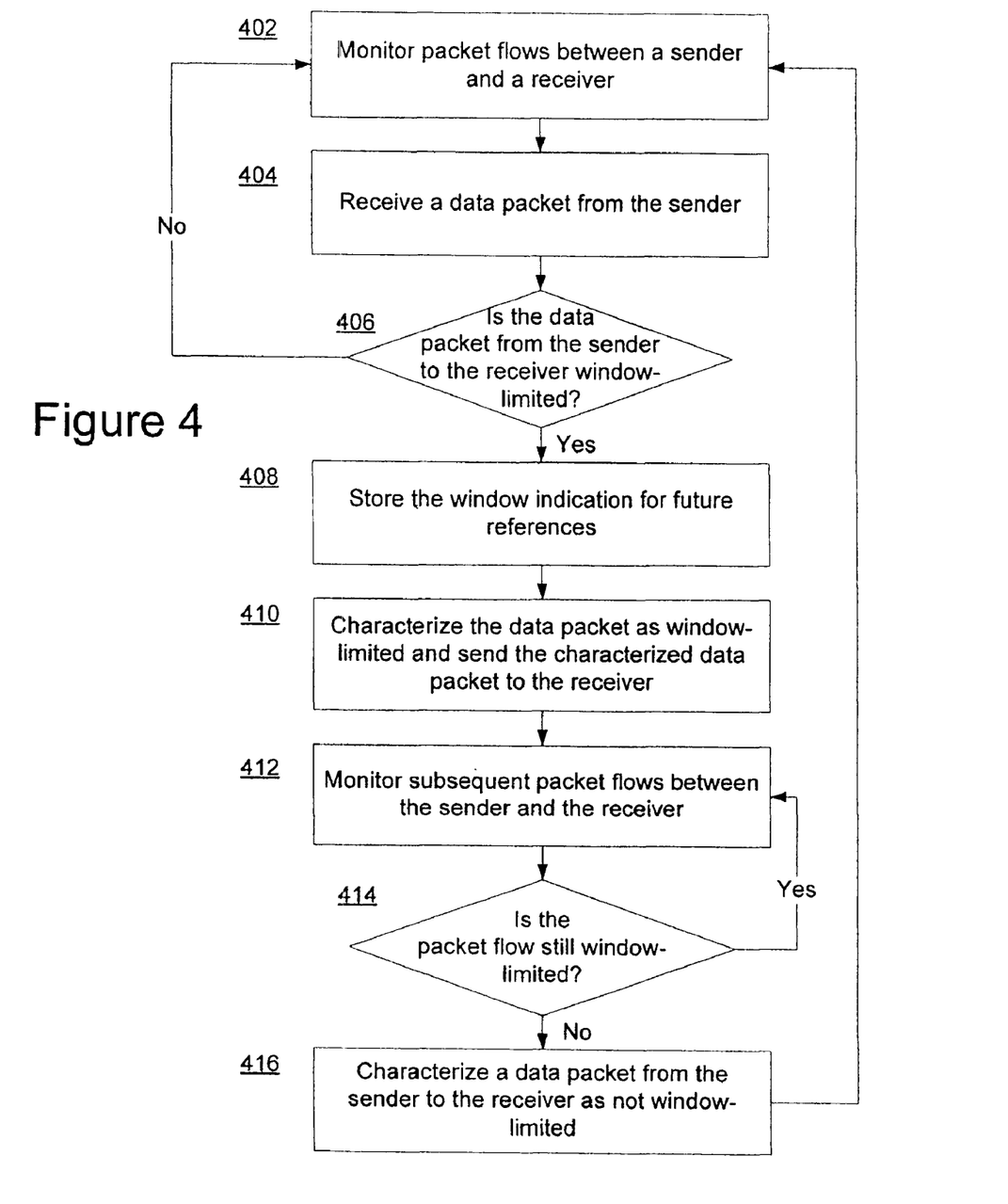
FIG. 4 is a flowchart illustrating a method implemented by one embodiment of the invention and executed by a control module relatively near a sender to optimize TCP's flow control.

FIG. 4 is a flowchart illustrating a TCP optimization routine that is implemented by one embodiment of the present invention and executed by control module 110 associated with sender 112. Control module 110 monitors 402 one or more packet flows between sender 112 and receiver 102. Specifically, control module 110 examines the sequence numbers of data packets sent by sender 112 and acknowledgment numbers and window indications of acknowledgment packets sent by receiver 102. Control module 110 receives 404 a data packet from sender 112. Control module 110 then determines 406 if the data packet from sender 112 to receiver 102 is window-limited. For instance, if the data packet carries bytes with sequence numbers at or near the top of the window indicated by receiver 102, then it is window-limited. If the data packet is not window-limited, control module 110 continues to monitor the packet flows between sender 112 and receiver 102 at 402. If the data packet is window-limited, control module 110 stores 408 the window indication in a memory area for future reference.

Control module 110 also characterizes 410 the data packet as window-limited and sends the characterized data packet to receiver 102. For example, control module 110 may characterize the data packet by using one or more fields available in the TCP header, adding data to the data packet, or using the lowest order bit of the window indication. Control module 110 monitors 412 subsequent packet flows between sender 112 and receiver 102. Control module 110 then determines 414 if the packet flow is still window-limited. If so, control module 110 continues to monitor the packet flows at 412. If not, control module 110 characterizes 416 a data packet from sender 112 to receiver 102 as not window-limited. The process flow then returns to 402.

Figure 5:
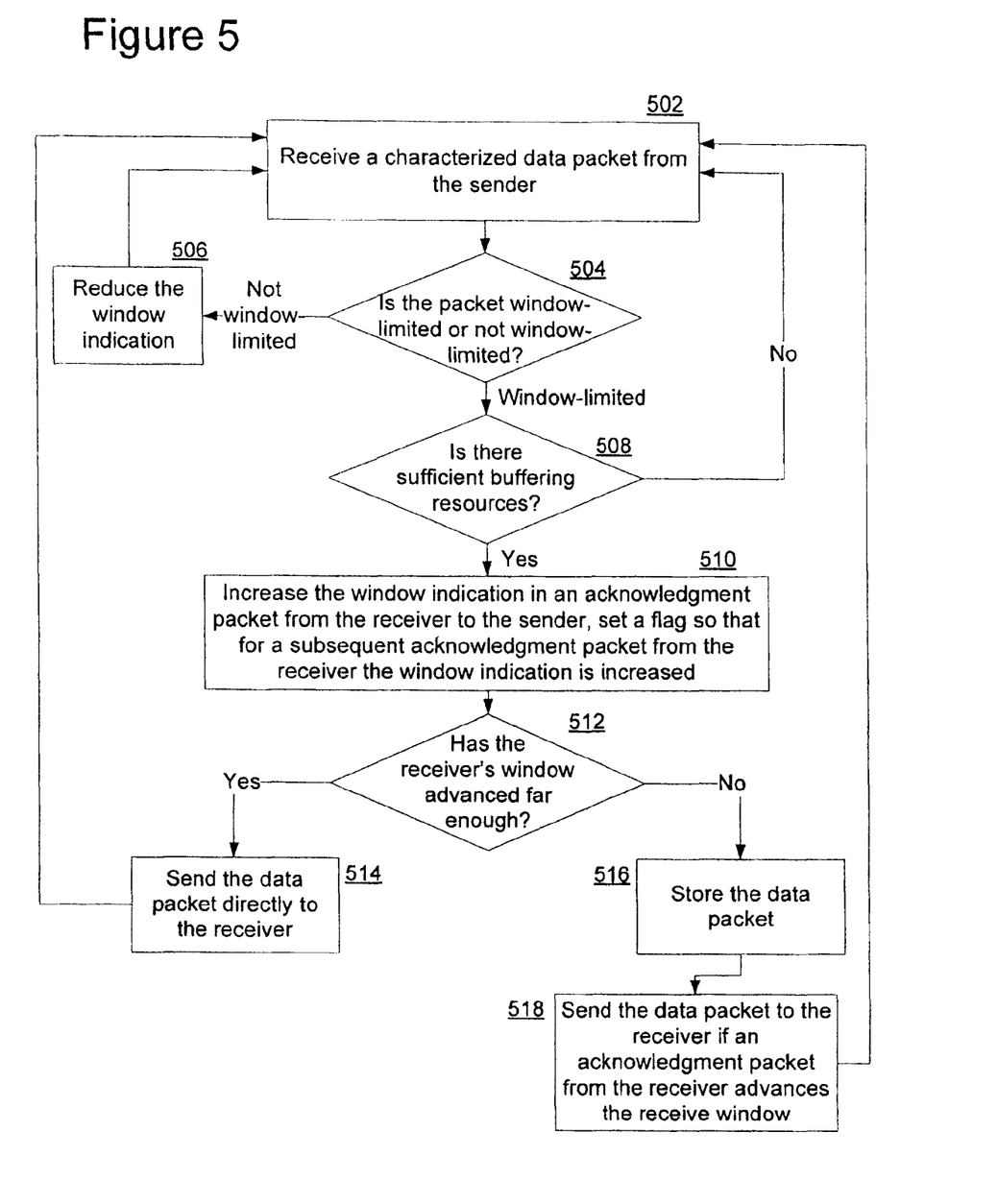
FIG. 5 is a flowchart illustrating a method implemented by one embodiment of the invention and executed by a control module relatively near a receiver to optimize TCP's flow control.

FIG. 5 is a flowchart illustrating a TCP optimization routine that is implemented by one embodiment of the present invention and executed by control module 104 associated with receiver 102. Control module 104 receives 502 a characterized data packet from sender 112. Control module 104 then determines 504 if this characterization indicates that the data packet is window-limited or not window-limited. If the characterization indicates not window-limited, control module 104 reduces 506 the window indication in an acknowledgment packet sent from receiver 102 to sender 112. According to an embodiment of the invention, the minimum size of the window indication is the size of the receive window. After control module 104 reduces the window indication, the process flow returns to 502. If the characterization indicates window-limited, control module 104 determines 508 if it has sufficient buffering resources. If control module 104 does not have sufficient buffering resources, it does not change the window indication, and the process flow returns to 502. If control module 104 has sufficient buffering resources, it increases 510 the window indication in an acknowledgment packet sent by receiver 102 to sender 112. Control module 104 also sets a flag so that for a subsequent acknowledgment packet from the receiver it also increases the window indication.

Control module 104 also determines 512 if receiver 102 has advanced the window far enough to accommodate the data packet from sender 112. If receiver 102 has advanced the window far enough, control module 104 sends 514 the data packet without the characterization directly to receiver 102. The process flow then returns to 502. If receiver 102 has not advanced the window far enough, control module stores 516 the data packet in its buffer. When the window is advanced far enough, as indicated in one or more acknowledgment packets sent by receiver 102, control module 104 sends 518 the data packet without the characterization to receiver 102. The process flow then returns to 502. In an embodiment of the invention, if TCP timestamp is used in the data packet, control module 104 adjusts the timestamp of the data packet to be as recent as the latest data packet from sender 112 to receiver 102, before sending the data packet to receiver 102.

Figure 6:
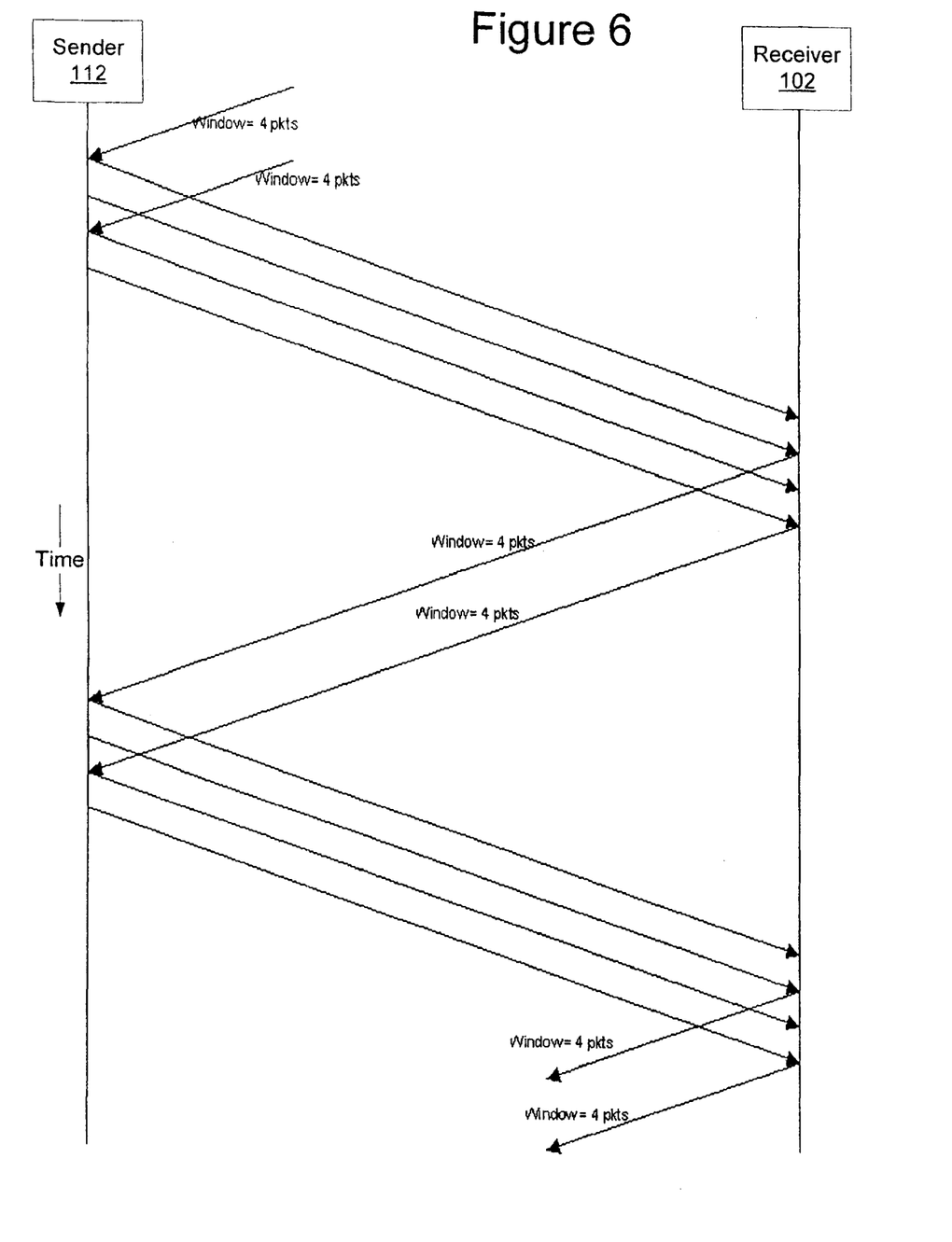
FIG. 6 is a timing diagram illustrating an example TCP transaction that is window-limited and without being optimized by an embodiment of the invention.

FIG. 6 shows a timing diagram of an example TCP transaction that is window-limited and without the optimization by control modules 104 and 110. In FIG. 6, data transfer is from sender 112 to receiver 102. Packets from receiver 102 to sender 112 are acknowledgment packets. Furthermore, one acknowledgment packet is assumed to be generated for every second data packet, and the window size indicated in the acknowledgment packets is assumed the equivalent of four packets. As can be seen from FIG. 6, when the window is limited and the latency is large between sender 112 and receiver 102, substantial time lapses between the sending of consecutive sets of data packets by sender 112 because of the delay in transmitting the acknowledgment packets by receiver 102. The latency-based TCP idle time causes a single TCP flow to achieve lower throughput than is actually available on the network link. This unused capacity translates into a higher transmission time since the TCP flow cannot utilize the full existing network bandwidth.

Figure 7:
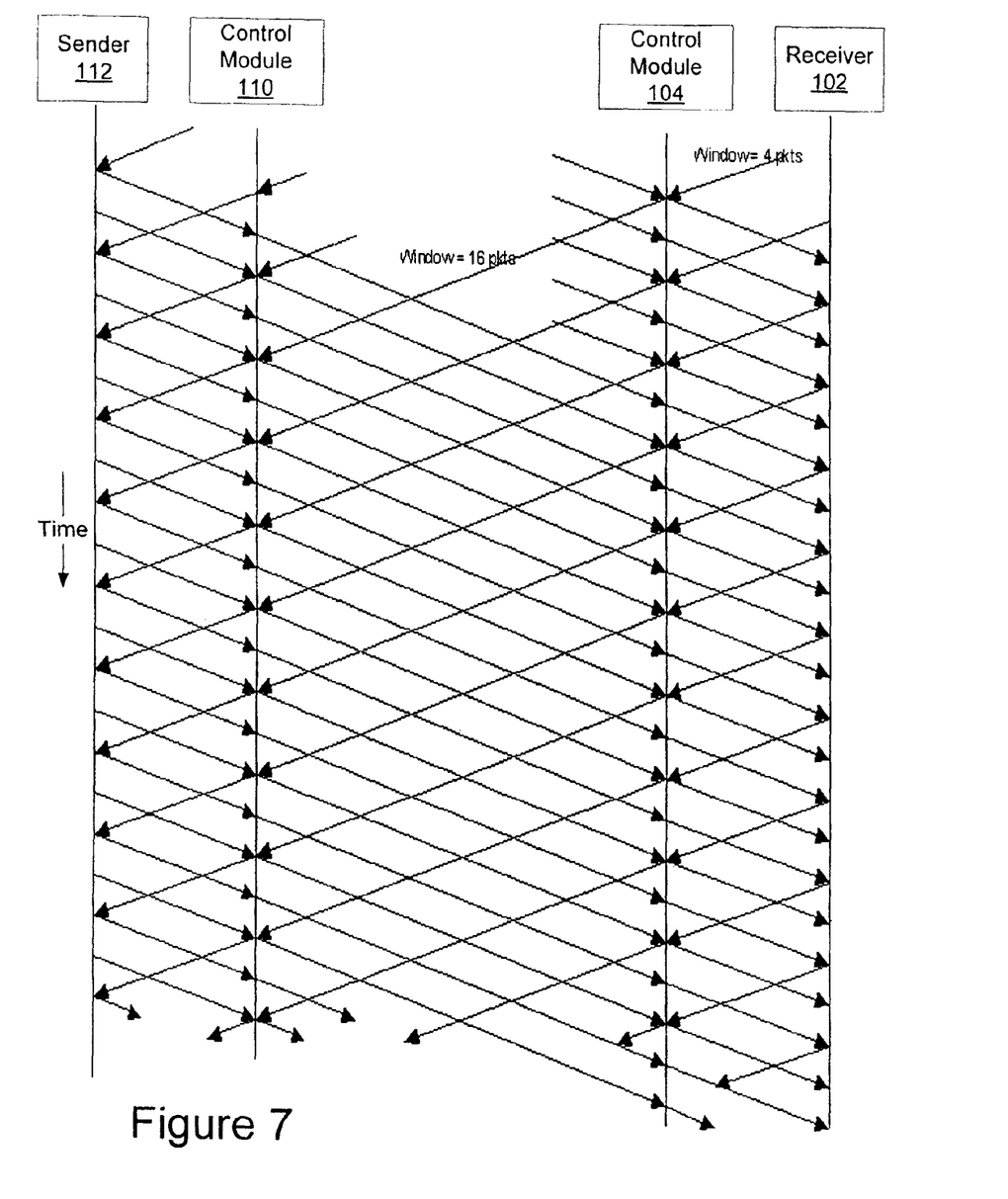
FIG. 7 is a timing diagram illustrating an example TCP transaction that is window-limited but is optimized by an embodiment of the invention.

FIG. 7 shows a timing diagram of an example TCP transaction that is window-limited but is optimized by control modules 104 and 110. In FIG. 7, data transfer is from sender 112 to receiver 102. Packets from receiver 102 to sender 112 are acknowledgment packets. Furthermore, one acknowledgment packet is assumed to be generated for every second data packet, and the window size indicated in the acknowledgment packets is assumed the equivalent of four packets, but is increased to 16 packets by control module 104 based on a packet-by-packet signal received from control module 110. As can be seen in FIG. 7, because of the larger indicated window size, sender 112 can transmit a larger amount of data into the network. Accordingly, there is not a substantial time lapse between the sending of consecutive sets of data packets and acknowledgment packets, as distinguishable from FIG. 6.

Thus, the optimization according to embodiments of the invention achieves a higher throughput and shorter transmission time than if the optimization is not used.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for determining performance of a network optimization in a control module, comprising the steps of:
    identifying a size of a packet being communicated between a sender and a receiver when the network optimization is used;
    determining, based on the identified size of the packet with the network optimization, a packet size adjustment that would be needed when the network optimization is not used for the packet to arrive at the receiver within an original size of the receiver's window and at a transfer rate consistent with the network optimization; and
    with the control module, reporting a performance of the network optimization based on the determined packet size adjustment.

2. The method of claim 1, wherein the step of determining the packet size adjustment comprises the step of:
    determining the packet size adjustment as a function of the original size of the receiver's window, a sequence number of a highest byte in the packet, and a current acknowledgment number of the packet.

3. The method of claim 2, wherein the step of determining the packet size adjustment comprises the steps of:
    determining a difference between the sequence number and the current acknowledgment number;
    determining a value by dividing the original size of the receiver's window by the determined difference; and
    multiplying the determined value with the identified size of the packet.

4. The method of claim 1, further comprising the step of:
    using the packet size adjustment to estimate a data transfer rate without the network optimization.

5. A system for determining performance of a network optimization comprising:
    a hardware-implemented processor; and
    a module, executing on the processor, for:
        identifying a size of a packet being communicated between a sender and a receiver when the network optimization is used;
        determining, based on the identified size of the packet with the network optimization, a packet size adjustment that would be needed when the network optimization is not used for the packet to arrive at the receiver within an original size of the receiver's window and at a transfer rate consistent with the network optimization; and
        reporting a performance of the network optimization based on the determined packet size adjustment.

6. The system of claim 5, wherein the module determines the packet size adjustment as a function of the original size of the receiver's window, a sequence number of a highest byte in the packet, and a current acknowledgment number of the packet.

7. The system of claim 6, wherein the module determines the packet size adjustment by:
    determining a difference between the sequence number and the current acknowledgment number;
    determining a value by dividing the original size of the receiver's window by the determined difference; and
    multiplying the determined value with the identified size of the packet.

8. The system of claim 5, wherein the module uses the packet size adjustment to estimate a data transfer rate without the network optimization.

9. A method for determining performance of a network optimization in a control module, comprising the steps of:
    identifying a size of a packet being communicated between a sender and a receiver when the network optimization is used;
    determining, based on the identified size of the packet with the network optimization, a packet size adjustment that would be needed when the network optimization is not used for the packet to arrive at the receiver within an original size of the receiver's window and at a transfer rate consistent with the network optimization; and
    using the packet size adjustment to estimate a data transfer rate without the network optimization.

10. The method of claim 9, further comprising:
    reporting the estimated data transfer rate without the network optimization.

* * * * *